Feb. 24, 1942.  W. WISK  2,274,571
AIRCRAFT CONTROL
Filed Sept. 25, 1940  2 Sheets-Sheet 2
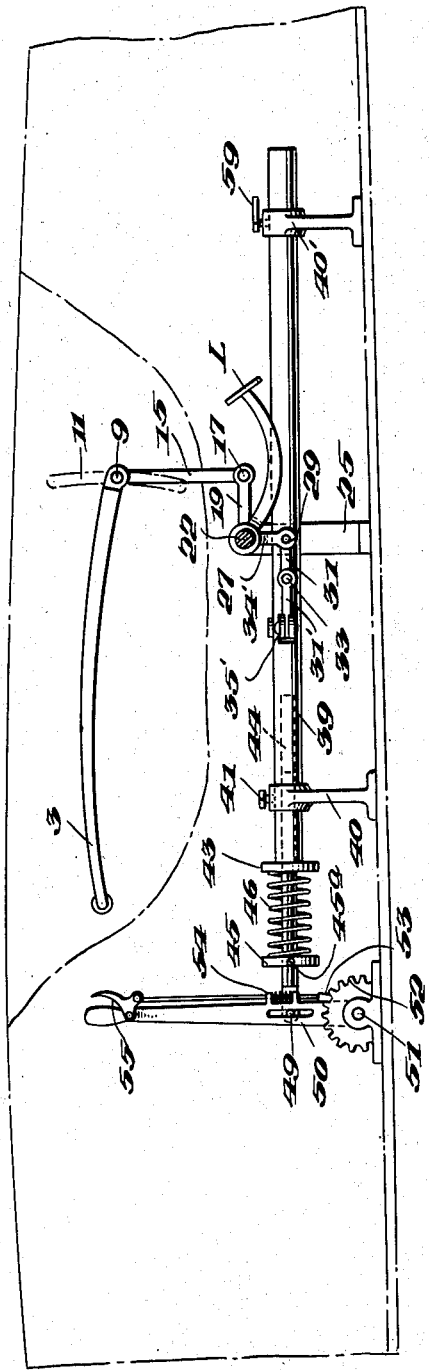
Inventor
WALTER WISK,
By
Attorney Patented Feb. 24, 1942

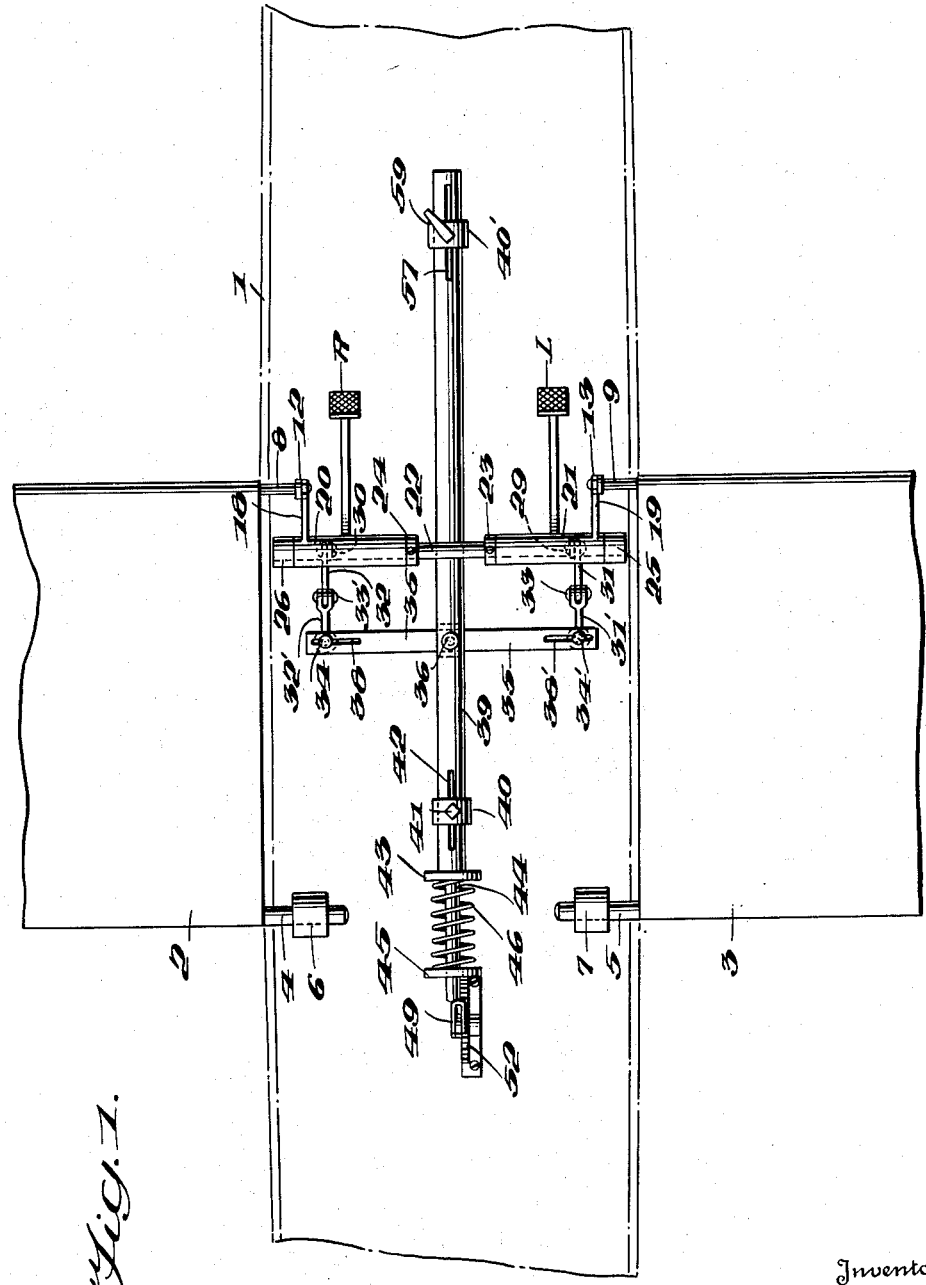

2,274,571

UNITED STATES PATENT OFFICE 2,274,571

AIRCRAFT CONTROL

Walter Wisk, New Britain, Conn.

Application September 25, 1940, Serial No. 358,333

8 Claims. (Cl. 244—83)

This invention relates to airplanes of the type having angularly adjustable supporting surfaces, such as pivoted wings.

The primary object of the invention is to provide an airplane having pivoted wings and a control mechanism therefor by means of which the angle of attack of either wing may be altered independently of the other or the angle of attack of both wings may simultaneously be similarly altered.

Another feature of the invention is the provision of mechanism for increasing the angle of attack of one wing while simultaneously reducing the angle of attack of the other wing.

Still another object of the invention is to provide mechanism for resiliently holding the wings of an airplane in any one of a plurality of angular positions.

It is further proposed to accomplish these and other objects by means of a simple, rugged, inexpensive and safe mechanism, the features of which will be clear from the following specification and the accompanying drawings, in which:

Fig. 1 is a plan view of the control mechanism mounted in a portion of an airplane as diagrammatically indicated;

Fig. 2 is an elevation, partially broken away, showing the portion of the airplane and control illustrated in Fig. 1; and Fig. 3 is a partial section taken along the lines 3—3 of Fig. 1, looking in the direction of the arrows.

Referring to the drawings, the reference numeral 1 designates the fuselage of an airplane on each side of which wings 2 and 3 are pivotally attached at their forward ends by pivot pins 4 and 5, respectively, supported in fixed bearings 6 and 7. The bearings are suitably mounted in the fuselage. In normal condition, wings 2 and 3 assume a slight positive angle of attack with respect to the passing wind so as to provide lift.

On the rear of wings 2 and 3 are mounted arms 8 and 9 which extend to the inside of the fuselage through arcuate slots 11 as shown best in Fig. 2.

Pivoted at their top ends to arms 8 and 9, as indicated at 12 and 13, are rods 14 and 15, which are pivoted at their respective lower ends 16 and 17 to crank arms 18 and 19, which are rigidly supported on sleeves 20 and 21.

Each of sleeves 20 and 21 is rotatably mounted on a cross rod 22 supported in the fuselage 1 at each end by bearings 25 and 26. Collars 23 and 24 form thrust bearings on rod 22 to prevent longitudinal displacement of the sleeves along the length of cross-rod 22.

As shown in Fig. 2, sleeve 21 has rigid therewith a lever 27 extending substantially at right angles with respect to crank arm 19 and connected by pivot 29 to linkage formed of link sections 31, 31' pivoted together to rock about a common, horizontally disposed pivot 33. Universal movement of the linkage is accomplished by the vertically disposed pivot pin 34' which slides in slot 38' to hold the front end of link section 31' between the spaced jaws 35' on one end of cross-arm 35. A similar assembly, as clearly shown in Fig. 1 and Fig. 3, comprising lever 28 pivoted at 30 to linkage formed by link sections 32, 32' pivoted together at 33' is connected by pivot 34 sliding in slot 38 in the other side of cross-arm 35.

Since cross-arm 35 is pivotally supported at its middle by pivot 36, it is apparent that when a left-hand pedal L, which is rigidly mounted on sleeve 21, is pushed down it rotates sleeve 21 rearwardly. Rearward rotation of sleeve 21 swings lever 19 downwardly and causes rod 15 to pull wing 3 down to increase the drag by increasing the positive angle of attack with respect to the passing wind.

As the left-hand pedal L is pushed down, cross-arm 35 is pivoted in a clockwise direction by forward movement of links 31, 31', thus to push links 32', 32 rearwardly. When links 32', 32 are pushed rearwardly, they rotate sleeve 20 forwardly and thus the arm 18 is swung to pivot the rear of wing 2 upwardly. By increasing the drag-lift on one side and by reducing the lift on the other side, a very rapid dropping off of the airplane is accomplished.

Simultaneous downward pivoting of the wings is accomplished by the sliding pivotal support of cross-arm 35. Cross-arm 35 is pivoted at its center by pin 36 to shaft 39 slidably supported in bearings 40, 40' rigid with the fuselage. A pin 41 in bearing 40 is slidable in a slotted keyway 42 in shaft 39 to prevent rotation of the shaft.

Shaft 39 is provided with an abutment 43 at its forward end and is bored, as indicated at 39', slidably to accommodate an elongated rod 44. Near the forward end of rod 44 a stop-collar 45, adjustably held by set screws 45a, forms a second abutment for coil spring 46 rigidly affixed by one end to abutment 43, as indicated in Fig. 3 at 47 and, as shown at 48, by the other end to stop-collar 45.

The forward end of rod 44 is attached by pivot 49 to lever 50 pivotally mounted at 51 in the fuselage and which is adjustably held by toothed segment 52 engaged by detent 53 operated by spring 54 and released by hand let-off lever 55.

Wings 2 and 3 are normally adjusted to a position giving a slight angle of attack by adjustment of lever 50. As the lever is moved rearwardly, rod 44 to which it is attached moves stop-collar 45 to compress spring 46 against abutment 48, thus resiliently to force shaft 39 rearwardly. When shaft 39 moves rearwardly, both ends of cross-arm 35 are moved rearwardly, thus to swing the rear of each of wings 2 and 3 upwardly.

During the take-off, the lever 50 is pushed forward to decrease the lift entirely by decreasing the angles of attack of both wings to obtain rapid ground speed. As ground speed is gained, lever 50 may be swung rearwardly to increase the angles of attack of the wings and the drag thereof.

It is also possible to ballast the airplane by adjustment of lever 50 to provide the correct angle of pitch in accordance with the cargo placement in the fuselage.

The rear end of shaft 39, which is normally slidable in bearing 40, is provided with a keyway 57. A set screw 58 having a handle 59 may be tightened to prevent shaft 39 from sliding. This prevents simultaneous pivoting of the wings in the same direction and is especially useful in stunt flying.

Sudden maneuvers are accomplished by pushing both pedals L and R forwardly at the same time. This abruptly brings the nose of the ship up and, while both pedals are forward, one or the other of the pedals may be let back to cause the corresponding side of the airplane to drop off.

While in the illustrated structure the controls are not centralized, it is clearly within the purview of the invention to provide centralization so that a single pilot may have the lever 50 and handle 59 within easy reach.

It is clear that equivalent operating elements may be substituted for those shown merely by way of example and that rearrangement or relocation of the parts may be made without departing from the basic concept, the scope of which is limited only by the following claims.

I claim:

1. A control mechanism for aircraft having a fuselage and at least two wings pivoted thereto, comprising a pair of spaced operating members respectively connected to said wings, each of said members being movable in one direction for imparting pivotal movement thereto, a cross-arm connected at its ends to said members and normally extending transverse to the direction of movement of said members, pivot means on said cross-arm intermediate said ends whereby, when one of said members is moved in one direction, the other of said members is moved in the other direction, and a bar slidable in the direction of its length slidably supporting said pivot means for sliding movement in a direction parallel to the direction of movement of said members whereby both wings may be moved together upon sliding movement of said bar and whereby one of said members may be held stationary while the other of said members and said bar are moved for pivoting only one of said wings.

2. In a control mechanism as claimed in claim 1, elastic means mounted between said bar and said fuselage for elastically resisting movement of said bar in at least one direction for resiliently holding said wings against pivoting.

3. In a control mechanism as claimed in claim 1, elastic means connected at one end to said bar, and an adjustable member mounting the other end of said elastic means in said fuselage for adjustment in a plane parallel to the direction in which said bar slides.

4. In a control mechanism as claimed in claim 1, a coil spring secured at one end to said bar, and adjustable lever means movable in a plane parallel to the direction in which said bar slides mounting the other end of said coil spring to said fuselage.

5. A control mechanism for aircraft having a fuselage and at least two wings pivoted at their front, inner ends to said fuselage, comprising a pair of spaced pedal-driven members operatively connected to the rear, inner ends of said wings for pivoting the rear of said wings downwardly and upwardly upon forward and rearward movement of said pedals, a cross bar normally extending transverse to the direction of movement of said members and connected at its ends to said members, a pivot on said bar intermediate said ends whereby, when one of said members is moved in one direction, the other of said members is moved in the opposite direction, an elongated element supporting said pivot, a bearing slidably supporting said elongated element in said fuselage for sliding movement in a direction parallel to the plane of movement of said members, said element having a first abutment thereon, an adjustable lever pivoted to said fuselage for movement in said direction, said lever having a second abutment-carrying element attached thereto, and a coil spring engaged between said abutments.

6. A control mechanism as claimed in claim 5, the ends of said coil spring being attached to said abutments.

7. A control mechanism as claimed in claim 5, and releasable means for releasably holding said elongated element against sliding.

8. In an aircraft having a fuselage and at least two wings pivoted thereto, a control mechanism comprising a pair of pedals respectively connected to said wings for imparting pivotal movement thereto, a cross-arm operably connected between said pedals, a sliding pivot slidably supporting said cross-arm in said fuselage for pivotal movement about an axis intermediate the ends of said cross-arm and for sliding movement in a direction parallel to the plane of movement of said pedals whereby, when one of said pedals is moved to pivot one of said wings in one direction, the other of said pedals is moved by said cross-arm to pivot the other of said pedals and wings in the opposite direction, and a spring engaged between said sliding pivot and said fuselage whereby one of said pedals may be held in one position while the other of said pedals is moved whereby to move one of said wings independently of the other.

WALTER WISK.